United States Patent
Belfort et al.

(10) Patent No.: US 6,852,769 B2
(45) Date of Patent: Feb. 8, 2005

(54) UV-ASSISTED GRAFTING OF PES AND PSF MEMBRANES

(75) Inventors: Georges Belfort, Slingerlands, NY (US); James V. Crivello, Clifton Park, NY (US); John Pieracci, Highland Park, IL (US)

(73) Assignee: Rensselaer Polytechnic Institute, Troy, NY (US)

( * ) Notice: Subject to any disclaimer, the term of this patent is extended or adjusted under 35 U.S.C. 154(b) by 126 days.

(21) Appl. No.: 10/398,051

(22) PCT Filed: Oct. 4, 2001

(86) PCT No.: PCT/US01/31166

§ 371 (c)(1),
(2), (4) Date: Apr. 1, 2003

(87) PCT Pub. No.: WO02/28947

PCT Pub. Date: Apr. 11, 2002

(65) Prior Publication Data

US 2003/0209487 A1 Nov. 13, 2003

Related U.S. Application Data

(60) Provisional application No. 60/238,209, filed on Oct. 5, 2000, provisional application No. 60/268,098, filed on Feb. 12, 2001, and provisional application No. 60/270,233, filed on Feb. 21, 2001.

(51) Int. Cl.[7] ............................ C08J 3/28; C08L 81/06; C08F 283/00; B01D 39/00

(52) U.S. Cl. .............................. 522/85; 522/85; 522/78; 522/79; 522/80; 210/490

(58) Field of Search .............................. 522/85, 84, 78, 522/79, 80; 210/490; 427/512

(56) References Cited

U.S. PATENT DOCUMENTS

| | | | | |
|---|---|---|---|---|
| 4,666,991 A | * | 5/1987 | Matsui et al. | 525/276 |
| 5,021,160 A | * | 6/1991 | Wolpert | 210/500.35 |
| 5,468,390 A | * | 11/1995 | Crivello et al. | 210/490 |
| 5,883,150 A | * | 3/1999 | Charkoudian | 522/136 |
| 5,942,555 A | * | 8/1999 | Swanson et al. | 522/35 |

* cited by examiner

Primary Examiner—Susan Berman
(74) Attorney, Agent, or Firm—Notaro & Michalos P.C.

(57) ABSTRACT

An ultrafiltration membrane is modified to exhibit low protein fouling and yet maintains a greater fraction of the original membrane permeability and retention properties after modification. This is achieved by grafting monomer onto the surface of a highly photoactive membrane such as polyethersulfone, via the process of dipping the polymeric membrane into a solution containing one or more monomers and a chain transfer agent, removing the membrane from the solution, securing the membrane inside of a quartz vessel contained within another vessel of liquid filter, and irradiating the membrane with a UV light at a wavelength between the range of 280 nm and 300 nm. High density grafting and shorter grafted monomer chain length result in low protein fouling and retention of permeability.

24 Claims, 5 Drawing Sheets

UV-ASSISTED GRAFTING OF PES AND PSF MEMBRANES

CROSS REFERENCE TO RELATED APPLICATION

This application claims the benefit of provisional application numbers:

| 60/238,209 | Filing Date: | Oct. 5, 2000 |
| 60/268,098 | Filing Date: | Feb. 12, 2001 |
| 60/270,233 | Filing Date: | Feb. 21, 2001 |

FIELD AND BACKGROUND OF THE INVENTION

The present invention relates in general to ultrafiltration membranes, and in particular to a new and useful polyethersulfone membrane and method for making such membrane by graft polymerization of particular vinyl monomers in the presence of UV radiation and a filter so that the membrane exhibits high solute retention, high permeability, and low fouling characteristics.

Ultrafiltration membranes have found widespread use in the food and biotechnology industries. Ultrafiltration (UF) has been applied in the processing of normal and transgenic milk, cheese and eggs, whey and potato protein recovery, the clarification of juices and wine, the recovery of proteins from animal blood, and the purification of water. UF is also used in the biotechnology industry for the recovery of biological products through such steps as cell broth clarification, cell harvesting, concentration or diafiltration of protein solutions prior to separation, and final concentration.

A major obstacle in the incorporation of membrane processes into industrial operations is the problem of flux decline due to fouling during the ultrafiltration of biological products such as proteins. Fouling not only decreases membrane permeability which reduces productivity due to longer filtration times, but also shortens membrane life due to the harsh chemicals necessary for cleaning. Furthermore, fouling can alter membrane selectivity and lead to significant product loss through denaturation.

While the exact mechanism of flux loss during protein filtration is not clear, the general consensus seems to be that the main causes are: osmotic back-pressure from concentration polarization, adsorption or deposition of proteins on the surface or in the pores, and compaction or consolidation of the adsorbed protein layer on upstream side of the membrane. Fouling is the reversible and irreversible adsorption and deposition of proteins and protein aggregates on the membrane surface and in the pores. This causes narrowing or plugging of membrane pores, which results in decreased membrane permeability. Irreversible fouling causes flux loss that is recovered only through the use of harsh detergents and/or chemicals. Flux loss caused by reversible protein fouling, however, is temporary for the protein can easily be removed by rinsing the membrane with water. Furthermore, after some time and under the right operating and solution conditions, further flux loss can occur because the adsorbed protein layer(s) can consolidate or compact into a more dense, higher flux-resistant layer.

To solve to reduce and remove flux loss, UV-assisted grafting of a monomer onto a membrane has been implemented. Grafting consists of attaching a smaller chemical unit to a main molecular chain. In the past, photoinitiators were used to initiate free radical polymerization at the membrane surface. However, the preferred method of attachment is by UV irradiation rather than plasma or chemical means, which has the advantages of simplicity and short reaction time. UV radiation is generally considered to have a wavelength range from 100 to 450 nm. UV irradiation can crosslink polymer chains and cleave polymer bonds, forming functional groups such as hydroxyls, carbonyls, or carboxylic acids on the membrane surface. Chemical bonds in the membrane polymer are cleaved directly. Free radical sites can be formed on the membrane surface through the cleavage of polymer bonds. When vinyl monomers are present, free radical graft polymerization occurs at these sites, forming polymer chains that are covalently bonded to the surface.

U.S. Pat. No. 5,468,390, and articles in *Journal of Membrane Science* 105(1995), p. 237–247 and *Journal of Membrane Science*, 105 (1995, p. 249–259), disclose modified aryl polysulfone membranes having a hydrophilic vinyl monomer chemically grafted to their pore wall surfaces. An unmodified membrane is contacted with a solution of the monomer and is exposed to ultraviolet light to effect photochemical grafting in the absence of a sensitizer or a free radical initiator. The monomers utilized function to render only the polysulfone membrane pore wall surface hydrophilic. The remaining portion of the membrane solid matrix comprises unmodified polysulfone. These surface-modified membranes are not rewettable after they have been dried and, if dried, lose significant permeability. Therefore it is necessary to maintain the membrane surfaces wet prior to use.

Japanese Pat. No. JP-A-2-59029, published Feb. 28, 1990, discloses a process for modifying a polysulfone porous membrane on its pore wall surface only with a polymerizable monomer by immersing the membrane in the monomer solution and irradiating the solution with ultraviolet light. The process is conducted under conditions such that any solvent used in the process does not dissolve the polysulfone membrane. As a result of the process, only the pore wall surface of the porous membrane is modified to render it hydrophilic when hydrophilic polymerizable monomers are utilized in the process. U.S. Pat. No. 5,468,390 teaches a method for photochemically modifying polysulfone UF membranes using ultraviolet (UV) assisted graft polymerization of hydrophilic vinyl monomers to reduce flux loss during the filtration of protein solutions. In particular, irradiation at 254 nm was used to create the radical sites necessary for the polymerization of the monomers to the membrane. The disclosed method consists of immersing the polysulfone membrane in a solution of hydrophilic vinyl monomer, and then irradiating the membrane at a wavelength of 254 nm.

However, recent testing has shown that even though UV-assisted graft polymerization achieved by an immersion technique successfully decreased fouling of membrane by imparting hydrophilicity to the surface, the membrane permeability was found to decrease sharply after modification due to blockage of the pores by the grafted polymer chains, caused by high chain density and long grafted chains. A necessary balance is sought between sufficient surface hydrophilicity for low fouling and higher membrane permeability. Furthermore, polysulfone membranes are not very photoactive (e.g., bonds are less easily broken), and therefore, are more difficult to modify. Accordingly, a modified membrane is desired that has high photoactivity, high graft density of short chains on its surface, exhibits low protein fouling, and maintains a greater fraction of the original membrane permeability after modification.

Furthermore, the immersion technique used in the prior art requires a large amount of monomer and is less adaptable to continuous processes on an industrial scale. Also, the immersion technique used in the prior art results in a high UV absorbance of monomer or shielding by the monomer solution, and a considerable amount of UV light does not reach the membrane. When UV light passes through to the membrane using the dipping technique, pore enlargement and a loss in protein rejection is observed because the UV light is not absorbed by the monomer solution as in the immersion technique. UV light at a wavelength of 254 nm has high energy capable of enlarging and damaging the pores, and thereby rendering the membrane useless. Therefore, a technique is required that will use less monomer and will allow a higher intensity, but lower energy UV light to reach the membrane, particularly because high intensity lower energy UV light optimizes the surface chain density and chain length for maximizing membrane permeability and retention properties, while reducing non-fouling characteristics.

Polyethersulfone is an optimal membrane material because it is widely used as a membrane in the biotechnology industry, it is relatively hydrophobic, and is intrinsically photoactive. Addition of a chain transfer agent facilitates termination of the monomer at various points to reduce the size of the grafted monomer chain. Furthermore, when modification is conducted with a dip technique rather than an immersion technique, a lower energy UV light in the range of 280 to 300 nm is desirable to prevent damage to the membrane because significantly more UV light reaches the membrane in the dipping technique. A filter is needed to assist in shielding out high energy UV light, and hence reducing pore enlargement. The altered dip modification technique using a liquid or solid filter will create modified membranes with lower protein fouling and reduced pore enlargement.

SUMMARY OF THE INVENTION

An object of the present invention is to provide an ultrafiltration membrane product having a porous body with high density grafting of short chain vinyl monomers on its surface. Thus, the membrane exhibits low protein fouling, and maintains a greater fraction of the original membrane permeability and retention properties after modification.

Though many materials are adequate for grafting monomer onto an ultrafiltration membrane, they must also be highly reactive so that polymerization occurs as quickly and efficiently as possible. The material used for membrane is selected for its high photoactivity. In particular, the preferred material for the membrane is polyethersulfone.

Another object of the present invention is to provide a method for making an ultrafiltration membrane, comprising dipping a polyethersulfone membrane in a solution containing one or more vinyl monomers, then irradiating the membrane in the presence of a liquid filter with a high intensity low energy UV light having a wavelength above 280 nm.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
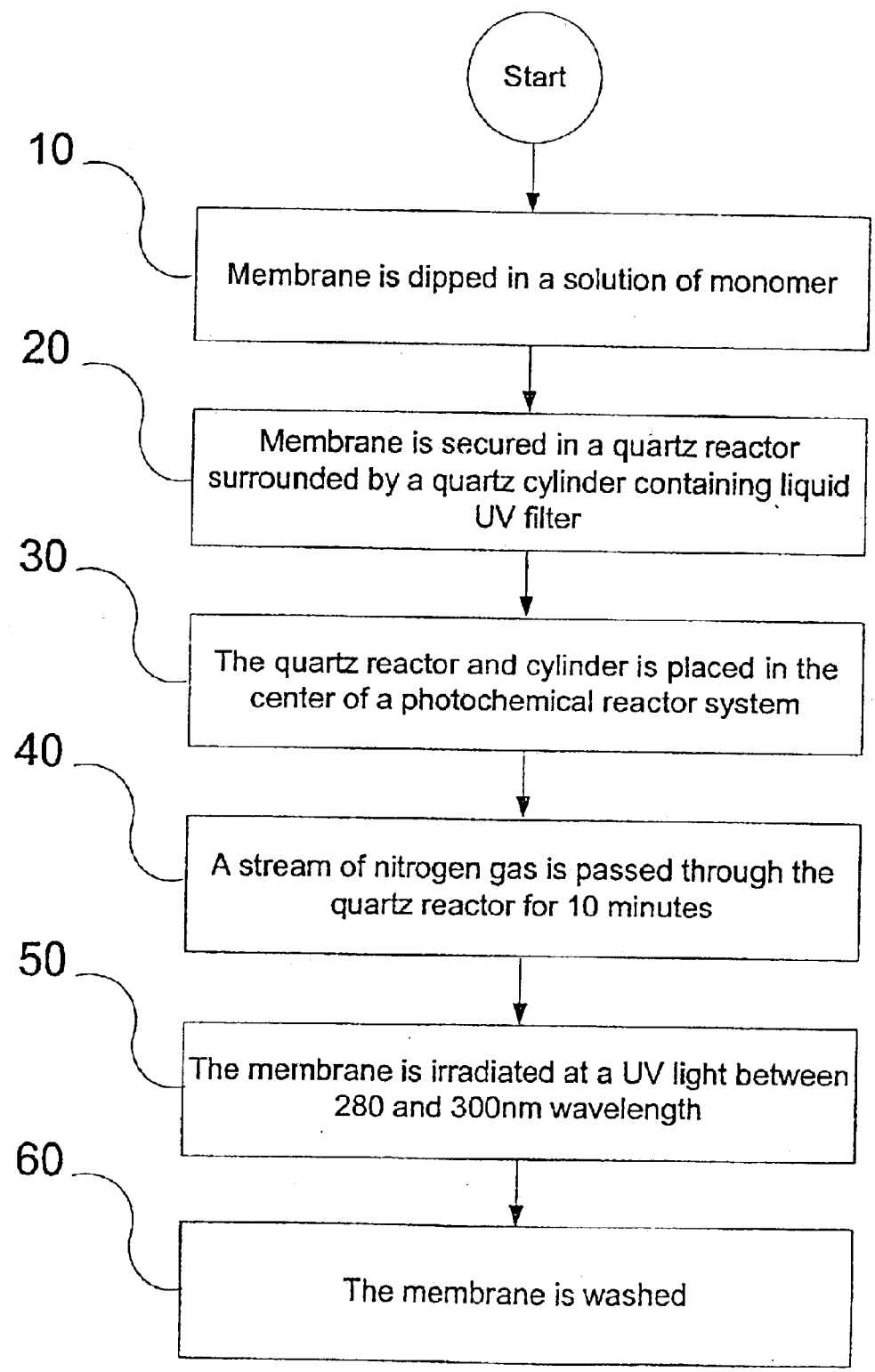
FIG. 1 is a is flow chart of a process for making a polyethersulfone membrane.

Referring to the drawings in which like reference numerals are used to refer to the same or functionally similar elements, the invention embodied therein in FIG. 1, is a process for making an ultrafiltration membrane, comprising a porous body and a plurality of grafted monomer chains on the surface of the membrane.

Step 10 consists of dipping a polyethersulfone ("PES") membrane into a solution of monomer for about 30 minutes accompanied by stirring. A 50 kDa PES UF membrane is suggested and may be obtained from Pall-Filtron Corp of East Hills, N.Y. It should be noted that both polysulfone and polyarylsulfone can be used in place of the polyethersulfone but are less reactive. The monomer in the solution may be a vinyl monomer. Preferred monomers include N-vinyl-2-pyrrolidinone ("NVP"), acrylamidoglycolic acid monohydrate ("AAG"), and acrylamido-1-methyl-propanesulfonic acid("AAP"), which may be obtained from Aldrich Chemical Co. in Milwaukee, Wis. Other monomers that may be used include 2-hydroxyethyl acrylate, 2-hydroxypropyl acrylate, 3-hydroxypropyl acrylate, 2-hydroxyethyl methacrylate, 2,3-dihydroxpropylacryalte, acrylamide, vinyl sulfonic acid, vinyl phosphoric acid, 4-styrenesulfonic acid, methacrylamide, glycidyl acrylate, glycidyl methacrylate, N-methylol-acrylamide, acrylic acid, methacrylic acid, methyl methacrylate, and N-vinyl carbazole. If the monomer solution employs NVP, it is suggested that the solution be prepared by vacuum distillation for removal of any inhibitors and then dissolved in deionized water. The monomer solution should also contain a chain transfer agent for reducing the length of the chains that are grafted to the surface of the membrane. One exemplary chain transfer agent that may be included in the aqueous monomer solution is n-dodecanethiol.

Figure 2:
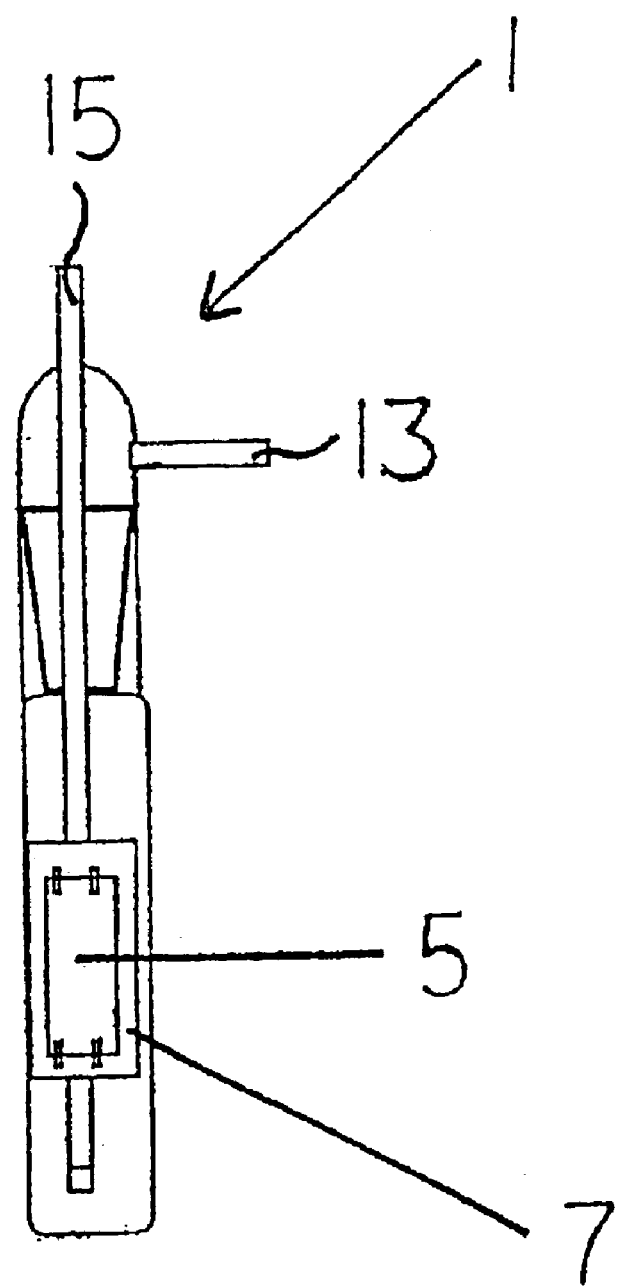
FIG. 2 is a view of the quartz vessel which contains and secures the polyethersulfone membrane.
Figure 3:
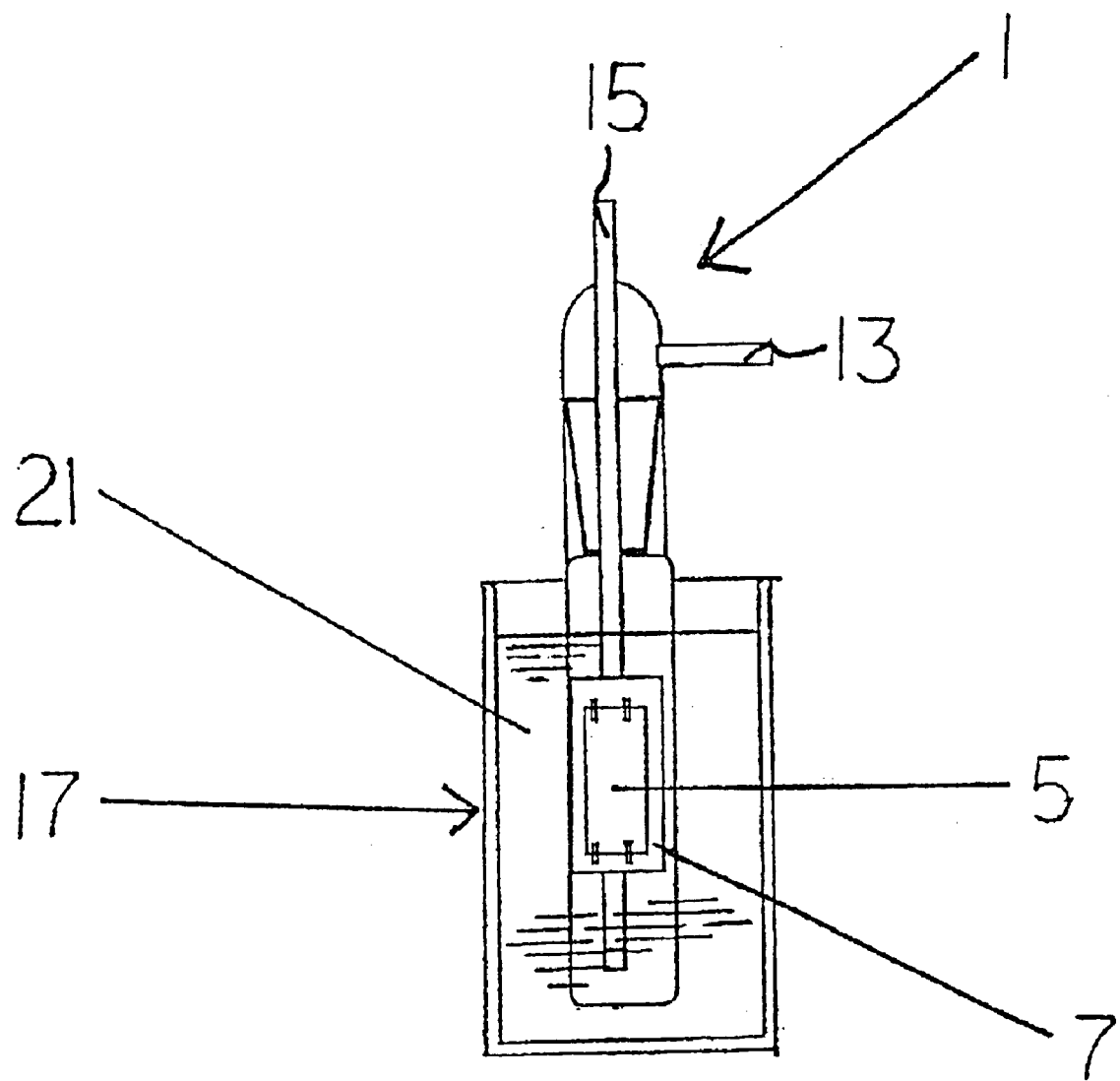
FIG. 3 is a view showing a quartz vessel within a quartz cylinder containing a UV liquid filter.

In step 20, the membrane is secured to a polypropylene holder, and placed in a quartz reactor vessel, which is best illustrated in FIG. 2 below. The quartz vessel is then secured in an annular quartz tube containing a liquid ultraviolet or UV filter. This is best illustrated in FIG. 3.

Figure 4:
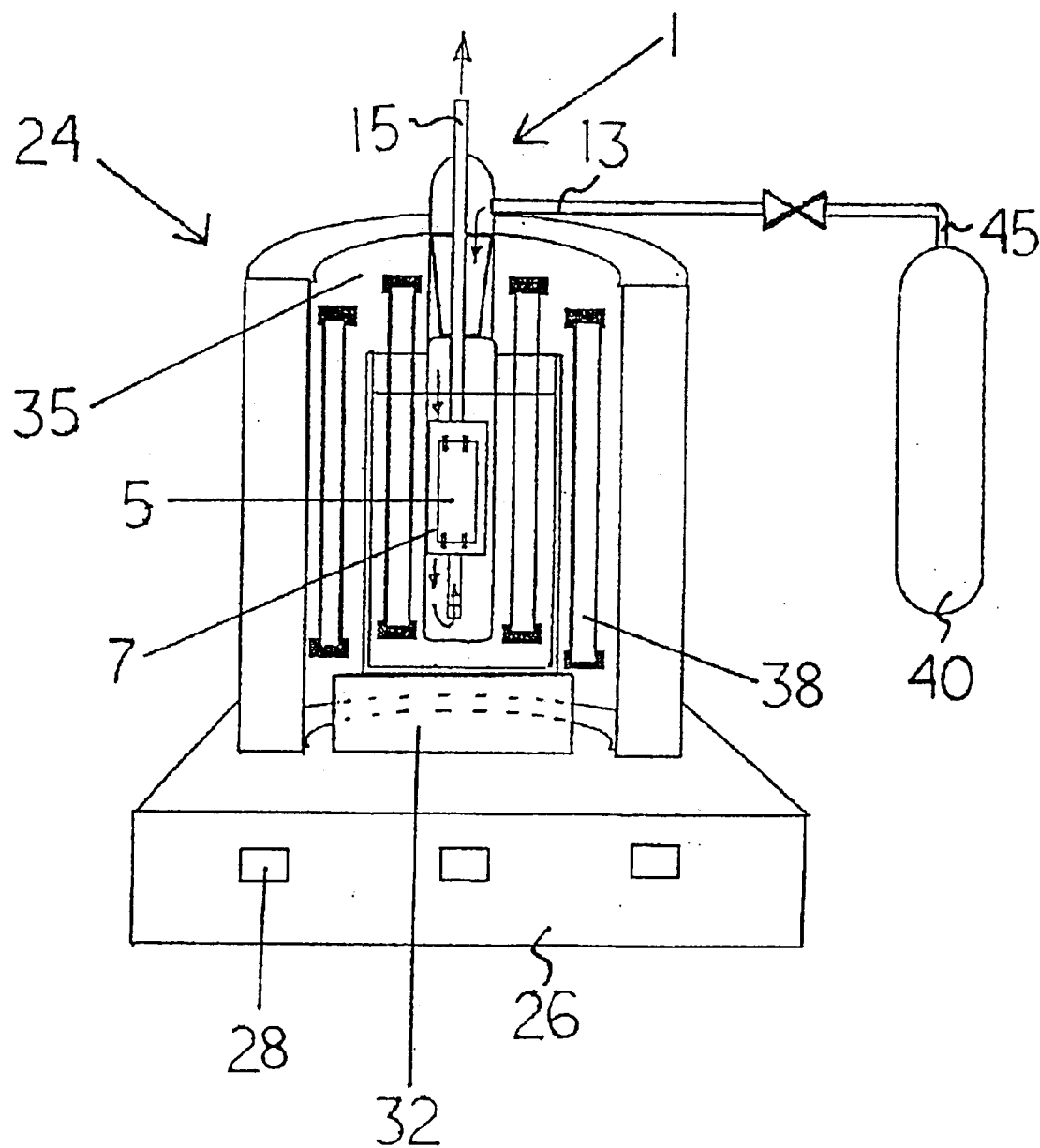
FIG. 4 is a view showing the quartz vessel and quartz cylinder placed within a photoreactor system.

In step 30, the quartz reactor and the quartz cylinder apparatus is placed in the center of a Rayonet Photochemical Chamber Reactor System (Model RPR-100), equipped with sixteen UV lamps, and manufactured by Southern New England Ultraviolet Company in Connecticut. As seen in FIG. 4, the quartz cylinder is placed on top of a base of the photochemical reactor system.

In step 40, a tank of nitrogen gas is attached to an inlet of the quartz vessel. A stream of nitrogen gas is released from the nitrogen tank and passes through an inlet in the quartz vessel to remove oxygen, which may terminate the free radicals formed during photochemical modification. The nitrogen stream must also pass through a small pool of water to saturate the quartz vessel with water vapor.

Step 50 consists of irradiating the membrane with UV light having a wavelength within the range of 280 to 300 nm. As shown in FIG. 4, an apparatus containing a plurality of UV lamps surrounding the membrane in the quartz vessel may be used to shine a UV light upon the membrane through a liquid filter.

In step 60, the quartz vessel is removed from the reactor and the and the newly modified membrane is washed to remove any unreacted monomer or physically adsorbed polymer. Washing may include shaking the membrane in a bottle of deionized water for 2 hours at room temperature. The time needed to wash the modified membrane may be be determined by monitoring the decrease of the PVP peak absorbance at 1678 $cm^{-1}$ using FTIR-ATR spectroscopy, which one skilled in the art would be able to accomplish. An unchanged absorbance peak after 2 hours signifies the completion of the washing phase of the process.

FIGS. 2, 3 and 4 illustrate an exemplary apparatus used to implement the invention. FIG. 2 shows a quartz vessel 1 containing a PES membrane 5, mounted on a plastic holder 7. The quartz vessel 1 may contain up to 300 ml volume, and measures 5.5 cm in diameter and 35 cm in length. The quartz vessel 1 also has an inlet 13 and an outlet 15 for nitrogen purging which is necessary for removal of oxygen. The PES membrane 5 may be prepared by spin coating a 5% by weight solution of PES in methylene chloride onto a quartz plate at 4000 rpm for 30 seconds and then drying it overnight at room temperature. The PES membrane 5 is made of polyethersulfone and contains a plurality of pores throughout. The plastic holder 7 may be polyethylene, polypropylene, or similar polymer. Nitrogen gas may pass through the inlet 13 and then through a pool of 25 to 30 ml of water to minimize water evaporation from the monomer solution on the PES membrane 5 surface. A glass frit at the bottom of the outlet 15 assists in $N_2$ sparging or agitating.

FIG. 3 shows a quartz vessel 1 contained within an annular quartz cylinder 17. The quartz cylinder 17 is filled with a UV liquid filter 21. The quartz vessel 1 is secured in the quartz cylinder 17 with clamps. The UV liquid filter 21 is preferably benzene, which has 0% transmission at a UV wavelength of 280 nm. Other solvents that may be used at higher wavelengths within the range of 280 nm to 300 nm include toluene, which has 0% transmission at 286 nm, and N-methylpyrrolidinone, which has 0% transmission at 285 nm.

FIG. 4 shows an exemplary embodiment of an apparatus used for irradiating a membrane through a liquid UV filter. In particular, a photochemical reactor system 24 is shown, containing a base 26, and having displayed lights 28 that are electrically wired to other components of the apparatus such as the power for the apparatus, a fan, or UV lamps, such that the displayed lights 28 turn on when one of these components are in use. The base 26 supports a secondary base 32, which may be used for heating or magnetically stirring the contents of a vessel. The quartz vessel 1 rests upon the secondary base 32, and is surrounded by a curved wall 35 containing a plurality of equally spaced and vertical UV lamps 38, which are a capable of emitting approximately 21 Watts of energy at the emission maximum of 300 nm wavelength UV light. The UV lamps 38 are 1 cm in diameter and 28 cm long, and are aligned with the axis of the quartz vessel 1 containing the PES membrane 5 and may be used to irradiate the PES membrane 5 through the UV liquid filter 21. The distance between the PES membrane 5 and the UV lamps 38 is approximately 6 cm. The quartz vessel 1 may be connected to a nitrogen tank 40 via a tubing that attaches between inlet 13 and the nitrogen tank outlet 45. Nitrogen gas travels through the tubing into the inlet 13, through the quartz vessel 1, and out of the outlet 15.

EXAMPLE 1

Various membranes were provided and compared for permeability, solute flux, and flux recovery. These membranes were either modified or unmodified. Unmodified regenerated cellulose ("RC") and PES membranes were provided as samples 1 and 2 respectively. PES was in other cases modified with 254 nm and 300 nm wavelength of UV light and was designated samples 3 and 4 respectively. PES was also modified with 300 nm UV light combined with two different types of light filters such as liquid benzene and a film of aromatic polyester, which was designated samples 5 and 6 respectively.

A 6×5 cm swatch of membrane, sufficient for protein filtration, was first cleaned by sonicating 3 times at room temperature in deionized water for 1 minute in order to remove the membrane wetting agent glycerol. A 5% by weight solution of NVP was prepared on a weight basis in deionized water. The membrane was then dipped in the NVP solution for 30 minutes with stirring. The membrane was then secured onto a square piece of polypropylene sheet by notches cut into the sheet. This assembly was placed in the quartz vessel which was then secured in the center of the photochemical reactor using clamps. A stream of nitrogen at a flow rate of 2 L/min (2–5 psig) was used to purge the vessel for 10 minutes, and was bubbled through about 20 ml of deionized water at the bottom of the quartz vessel to maintain the humidity levels in the quartz vessel.

Modified sample 3 was irradiated by the UV lamps at 254 nm. Modified sample 4 was irradiated by the UV lamps at 300 nm. Modified sample 5 was irradiated by the UV lamps at 300 nm while contained within a quartz cylinder filled with liquid benzene. Modified sample 6 was irradiated by the UV lamps after a film of aromatic polyester was used for shielding. After irradiation was complete, the quartz vessel was removed from the reactor, the membrane washed to remove any unreacted monomer or physically adsorbed polymer by shaking them in bottles of deionized water for 2 hours at room temperature.

Due to the higher average emitted frequencies with the 254 nm UV lamps and thus higher energies, more NVP was grafted onto the PES membranes with the 254 nm UV light than with the 300 nm light or the filtered 300 nm light. Thus, flux was maintained and so was solute retention with the latter modified membranes of samples 4, 5, and 6. These modified membranes exhibited higher total performance than RC or the unmodified membranes, in terms of permeability, solute flux or retention, and cleanability or flux recovery after water washing.

EXAMPLE 2

A 50 kDa Omega PES membrane from Pall corp, a 50 kDa Polysulfone ("PSF") GR51 PP membrane from Danish Separations Systems, and a 50 kDa regenerated cellulose membrane from Pall Filtron were provided. They were dipped in monomer solutions of 5% by weight NVP, AAG, and AAP. Only UV lamps that emit their maximum frequency at 300 nm were used to irradiate. The degree of grafting was compared. Degree of grafting ("DG") equals the ratio of the peak height of the amide I carbonyl stretch in the monomer molecule to that of the benzene ring carbon-carbon double bond stretch. For the PES membrane, optimal grafting conditions with the three different monomers was at the lowest irradiation energy. PES is much more sensitive than PSf toward UV radiation, and is preferred, but both are acceptable for use.

EXAMPLE 3

A 50 kDa PES membrane was provided. Dip modification was with 5 wt % NVP for different times (hence different irradiation energies) with the listed conditions. Two filters, benzene liquid and aromatic polyester film, were used with 300 nm UV light. A regenerated cellulose membrane was used as the control surface. A solution of 0.1 wt % BSA in 10 mM PBS at pH=7.4 and 22° C. was filtered according to a constant volume diafiltration protocol.

Figure 5:
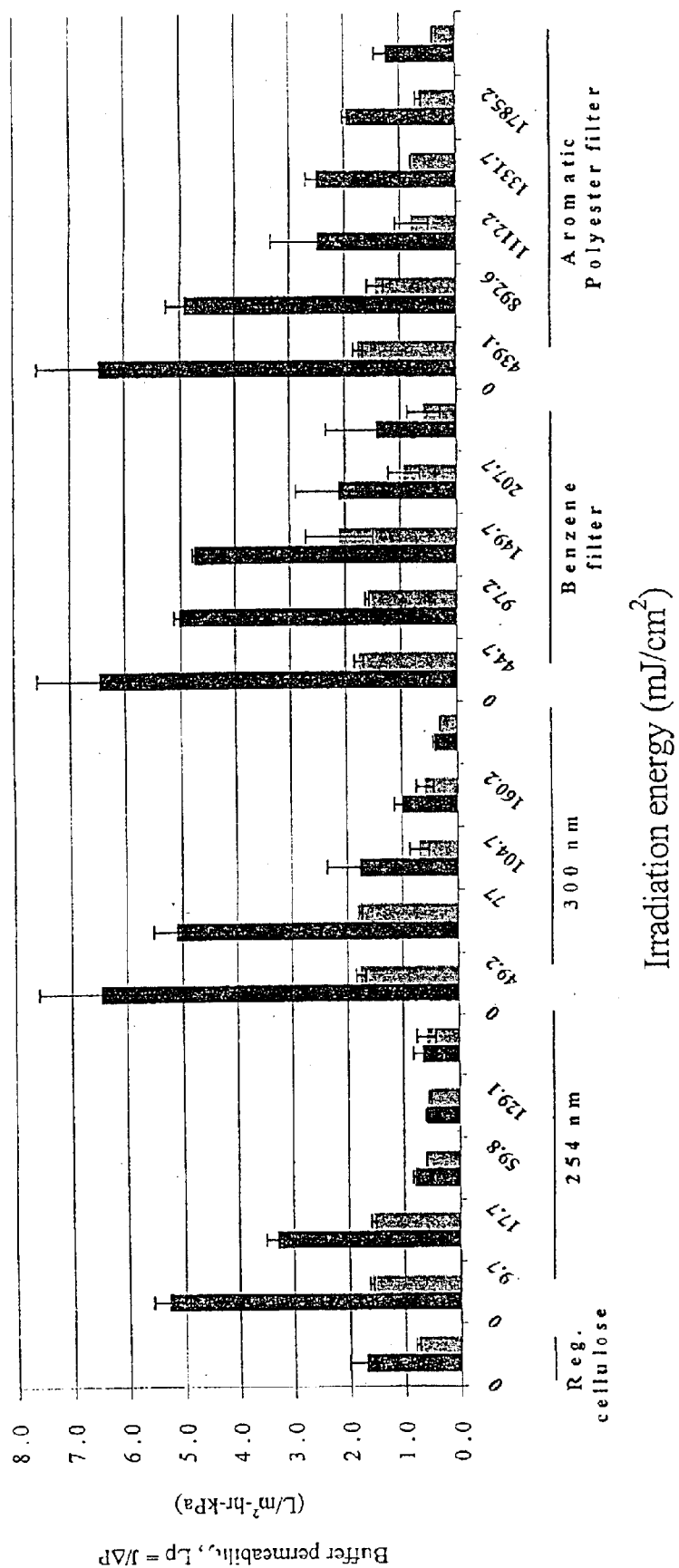
FIG. 5 is a graph plotting protein solution permeability as a function of irradiation energy exposure.

FIG. 5 shows a graph plotting protein solution permeability as a function of irradiation energy exposure. The black bars represent the pure buffer permeability and the grey bars represent the protein solution permeability. Permeability was optimal with a benzene filter and irradiation at 300 nm wavelength. Permeability, along with solute flux and retention were optimal at lower irradiation energies.

While specific embodiments of the invention have been shown and described in detail to illustrate the application of the principles of the invention, it will be understood that the invention may be embodied otherwise without departing from such principles.

What is claimed is:

1. A method for modifying a polymeric photoactive sulfone membrane, to increase a graft density, decrease a chain size on a surface of the membrane after grafting, reduce protein fouling and maintain a greater fraction of the original membrane permeability and retention properties after modification, the method comprising:

dipping the polymeric photoactive sulfone membrane into a solution of monomers containing a chain transfer agent;

removing the polymeric photoactive sulfone membrane from the solution of monomers;

exposing the polymeric photoactive sulfone membrane to UV radiation in the presence of a filter; and washing the polymeric photoactive sulfone membrane.

2. A method according to claim 1, further comprising selecting the polymeric photoactive sulfone membrane from the group consisting of polysulfone, polyethersulfone, and polyarylsulfone.

3. A method according to claim 2, wherein the solution of monomers comprises at least one vinyl monomer.

4. A method according to claim 2, wherein the solution of monomers comprises at least one methacrylate.

5. A method according to claim 3, wherein the wavelength of UV radiation the membrane is exposed to is at least 280 nm.

6. A method according to claim 4, wherein the wavelength of UV radiation the membrane is exposed to is at least 280 nm.

7. A method according to claim 5, wherein the filter is a liquid or solid.

8. A method according to claim 6, wherein the filter is a liquid or solid.

9. A method according to claim 7, wherein the liquid filter is benzene.

10. A method according to claim 8, wherein the liquid filter is benzene.

11. A method according to claim 7, wherein the solid filter is aromatic polyester.

12. A method according to claim 8, wherein the solid filter is aromatic polyester.

13. A process for making an improved polymeric sulfone membrane, comprising the steps of:

dipping the polymeric sulfone membrane into a solution of monomers containing a chain transfer agent;

removing the polymeric sulfone membrane from the solution of monomers;

securing the polymeric sulfone membrane to a plastic holder;

securing the polymeric sulfone membrane and plastic holder in a quartz vessel;

placing the polymeric sulfone membrane and the quartz vessel into a quartz cylinder containing a filter placing the polymeric sulfone membrane, quartz vessel, and quartz cylinder in a photoreactor system exposing the polymeric sulfone membrane to UV radiation in the presence of the filter; and washing the polymeric sulfone membrane.

14. A process according to claim 13, further comprising selecting the polymeric photoactive sulfone membrane from the group consisting of polysulfone, polyethersulfone, and polyarylsulfone.

15. A process according to claim 14, wherein the solution of monomers comprises at least one vinyl monomer.

16. A process according to claim 14, wherein the solution of monomers comprises at least one methacrylate.

17. A process according to claim 15, wherein the wavelength of exposed UV radiation is between about 280–300 nm.

18. A process according to claim 16, wherein the wavelength of exposed UV radiation is between about 280–300 nm.

19. A process according to claim 17, wherein the filter is liquid or solid.

20. A process according to claim 18, wherein the filter is liquid or solid.

21. A process according to claim 19, wherein the liquid filter is benzene.

22. A process according to claim 20, wherein the liquid filter is benzene.

23. A process according to claim 19, wherein the solid filter is aromatic polyester.

24. A process according to claim 20, wherein the solid filter is aromatic polyester.

* * * * *